United States Patent

[19] Ouchi

[11] Patent Number: 5,867,213
[45] Date of Patent: Feb. 2, 1999

[54] IMAGE PICKUP APPARATUS HAVING IMAGE-SHAKE CORRECTING DEVICES DETERMINED ACCORDING TO ZOOM MAGNIFYING POWER

[75] Inventor: Toshimichi Ouchi, Kanagawa-ken, Japan

[73] Assignee: Canon Kabushiki Kaisha, Tokyo, Japan

[21] Appl. No.: 916,947

[22] Filed: Aug. 25, 1997

Related U.S. Application Data

[63] Continuation of Ser. No. 321,882, Oct. 14, 1994.

[30] Foreign Application Priority Data

Oct. 21, 1993 [JP] Japan ................................ 5-285682

[51] Int. Cl.⁶ ............................ H04N 5/228; H04N 5/225
[52] U.S. Cl. ............................................. 348/208; 348/358
[58] Field of Search .................................. 348/208, 207, 348/358; 364/413.19; 359/557; 354/430

[56] References Cited

U.S. PATENT DOCUMENTS

| | | | |
|---|---|---|---|
| 4,780,739 | 10/1988 | Kawakami et al. | 354/430 |
| 4,939,645 | 7/1990 | Hopkinson | 364/413.19 |
| 5,182,671 | 1/1993 | Kitagishi et al. | 359/557 |
| 5,282,044 | 1/1994 | Misawa et al. | 348/208 |
| 5,606,546 | 2/1997 | Best et al. | 369/275.1 |
| 5,654,752 | 8/1997 | Yamazaki | 348/208 |
| 5,657,080 | 8/1997 | Sekine | 348/208 |
| 5,672,862 | 9/1997 | Ohara et al. | 359/557 |

OTHER PUBLICATIONS

Uomori et al., Automatic Image Stabilizing System by Full–Digital Signal Processing; IEEE Trans. on Consumer Electronics; Aug. 1990; pp. 510–519.

*Primary Examiner*—Wendy Garber
*Assistant Examiner*—Luong Nguyen
*Attorney, Agent, or Firm*—Fitzpatrick, Cella, Harper & Scinto

[57] ABSTRACT

An image pickup apparatus is provided with a vibration sensor for detecting vibrations of the apparatus, an optical image-shake correcting device for optically correcting an image shake according to an output of the vibration sensor, an electronic image-shake correcting device for electronically correcting the image shake according to an output of the vibration sensor. The apparatus includes a control circuit arranged to select either the optical image-shake correcting device or the electronic image-shake correcting device according to the focal length of an image-pickup optical system of the apparatus.

60 Claims, 4 Drawing Sheets

IMAGE PICKUP APPARATUS HAVING IMAGE-SHAKE CORRECTING DEVICES DETERMINED ACCORDING TO ZOOM MAGNIFYING POWER

This application is a continuation of application Ser. No. 08/321,882 filed Oct. 14, 1994.

BACKGROUND OF THE INVENTION

1. Field of the Invention

This invention relates to an image pickup apparatus, such as a still camera or a video camera or the like, having a function of stabilizing picked-up images by correcting a shake of the images caused by vibrations of the image pickup apparatus.

2. Description of the Related Art

The automation of image pickup apparatuses such as still cameras, video cameras or the like has recently advanced. Automatic exposure and automatic focusing mechanisms are now widely in use. In addition to these mechanisms, the function of correcting an image shake due to vibrations of the apparatus, i.e., a image stabilizing function, has been variously contrived for image pickup apparatuses. Some of these contrivances are now being put in practice.

The currently known means for correcting an image shake due to vibrations of the apparatus can be roughly divided into two kinds. One is optical image-shake correcting means which optically corrects an image shake by using a variable angle prism. The other is electronic image-shake correcting means which is arranged to temporarily store image information and then to electronically correct an image shake.

Among the conventional image pickup apparatuses having the image stabilizing function, an image pickup apparatus provided with the optical image-shake correcting means has presented the following problem: During the image stabilizing action, it is necessary to always drive two actuators, one for correction in the direction of pitch (vertical direction) and the other for correction in the direction of yaw (horizontal direction). Driving the actuators in this manner causes much consumption of electrical energy. In a case where a battery is used for a power supply, the battery must be frequently replaced.

On the other hand, an image pickup apparatus provided with the electronic image-shake correcting means has presented the following problem: The resolution of the apparatus becomes lower as it is arranged to use a part of the image information temporarily stored. The quality of images saliently deteriorates particularly in the event of an object having a high frequency component in a large amount within the picked-up image signal, such as a fine pattern or a distant landscape.

SUMMARY OF THE INVENTION

This invention is directed to the solution of the above-stated problems. It is, therefore, an object of this invention to provide an image pickup apparatus which is arranged to be capable of carrying out an image stabilizing action in an optimum manner by adaptively activating a plurality of kinds of image stabilizing means.

It is another object of this invention to provide an image pickup apparatus having an image stabilizing function which is arranged to save electrical energy and to be capable of picking up images without deteriorating image quality even in the case of an object of shooting where a video image representing the object includes a high frequency component in a large amount.

To attain the above-stated objects, an image pickup apparatus having an image stabilizing function arranged as a preferred embodiment of this invention is provided with vibration detecting means for detecting vibrations imparted to the image pickup apparatus, first image-shake correcting means for correcting a shake of a picked-up image, second image-shake correcting means for correcting the shake of the picked-up image independently of the first image-shake correcting means, focal-length detecting means for detecting the focal length of an image-pickup optical system of the image pickup apparatus, and selection means for selecting one of the first image-shake correcting means and the second image-shake correcting means according to the focal length detected by the focal-length detecting means.

In the preferred embodiment of this invention, the above-stated selection means is arranged to select the first image-shake correcting means which is an optical image-shake correcting means when the focal length of the image-pickup optical system belongs to a telephoto side and to select the second image-shake correcting means which is an electronic image-shake correcting means when the focal length of the image-pickup optical system belongs to a wide-angle side.

To attain the above-stated objects, an image pickup apparatus having an image stabilizing function arranged as another embodiment of this invention is provided with vibration detecting means for detecting vibrations imparted to the image pickup apparatus, first image-shake correcting means for correcting a shake of a picked-up image, second image-shake correcting means for correcting the shake of the picked-up image independently of the first image-shake correcting means, extracting means for extracting a high frequency component of a video signal, and selection means for selecting one of the first image-shake correcting means and the second image-shake correcting means according to a value of the high frequency component extracted by the extracting means.

Further, to attain the above-stated objects, in the image pickup apparatus, the selection means is arranged to select the first image-shake correcting means which is an optical image-shake correcting means when the value of the high frequency component of the video signal is equal to or larger than a predetermined value and to select the second image-shake correcting means which is an electronic image-shake correcting means when the value of the high frequency component of the video signal is less than the predetermined value.

With the image pickup apparatus having the image stabilizing function arranged as described above, the selection means selects either the first (optical) image-shake correcting means or the second (electronic) image-shake correcting means according to the focal length of the image pickup optical system of the apparatus.

Further, the selection means may be arranged to select either the first (optical) image-shake correcting means or the second (electronic) image-shake correcting means according to the value of a high frequency component of the video signal.

These and other objects and features of this invention will become apparent from the following detailed description of embodiments thereof taken in conjunction with the accompanying drawings.

DETAILED DESCRIPTION OF PREFERRED EMBODIMENT

Figure 1:
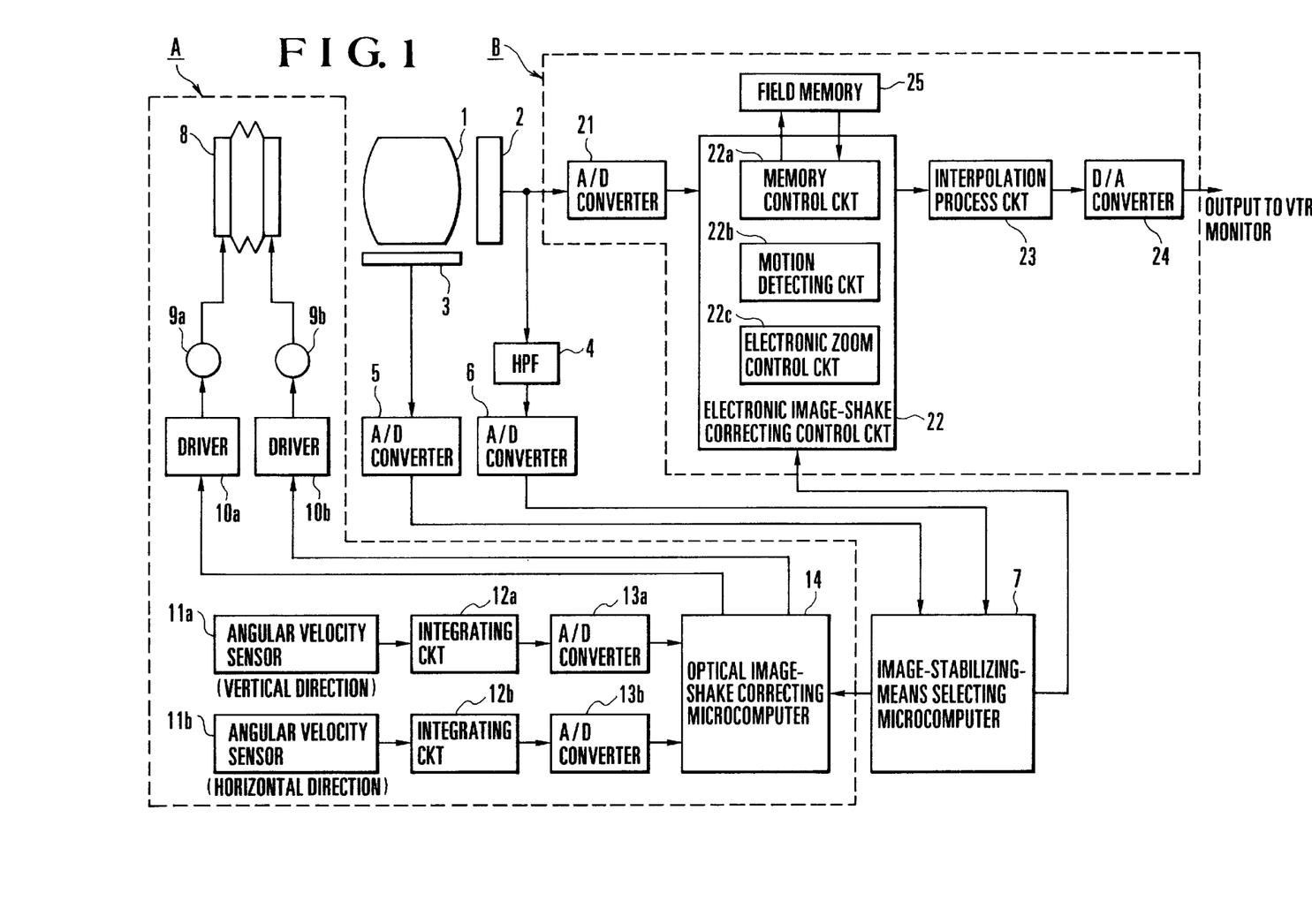
FIG. 1 is a block diagram showing an image pickup apparatus having an image stabilizing function according to an embodiment of this invention.

An embodiment of this invention is described with reference to the accompanying drawings as follows:

FIG. 1 shows in a block diagram the arrangement of an image pickup apparatus having an image stabilizing function and arranged according to this invention as an embodiment thereof. Referring to FIG. 1, an image pickup optical system 1 is provided with a magnifying power variable lens which is arranged to form an optical image of an object of shooting. An image sensor 2 which is a CCD or the like is arranged to convert the optical image inputted from the image pickup optical system 1 into an electrical signal and to output it as a video signal. An encoder 3 is arranged to detect the focal length of the image pickup optical system 1. A high-pass filter (HPF) 4 is arranged to extract only a high frequency component included in the video signal outputted from the image sensor 2. A first A/D converter 5 is arranged to convert an analog signal outputted from the encoder 3 into a digital signal. A second A/D converter 6 is arranged to convert an analog signal outputted from the high-pass filter (HPF) 4 into a digital signal. A microcomputer 7 provided for selecting image stabilizing means is arranged to select either an optical image-shake correcting means A (image stabilizing means A) or an electronic image-shake correcting means B (image stabilizing means B) according to the focal length of the image pickup optical system and the value of the high frequency component included in the video signal.

The optical image-shake correcting means A consists of various parts including a variable angle prism 8 which is a correcting optical system, a pair of actuators 9a and 9b which are arranged to drive the variable angle prism 8, a pair of driving circuits (or drivers) 10a and 10b, a pair of angular velocity sensors 11a and 11b, a pair of integrating circuits 12a and 12b, a pair of A/D converters 13a and 13b, and an optical image-shake correcting microcomputer 14 arranged to drive and control the optical image-shake correcting means A.

Figure 2:
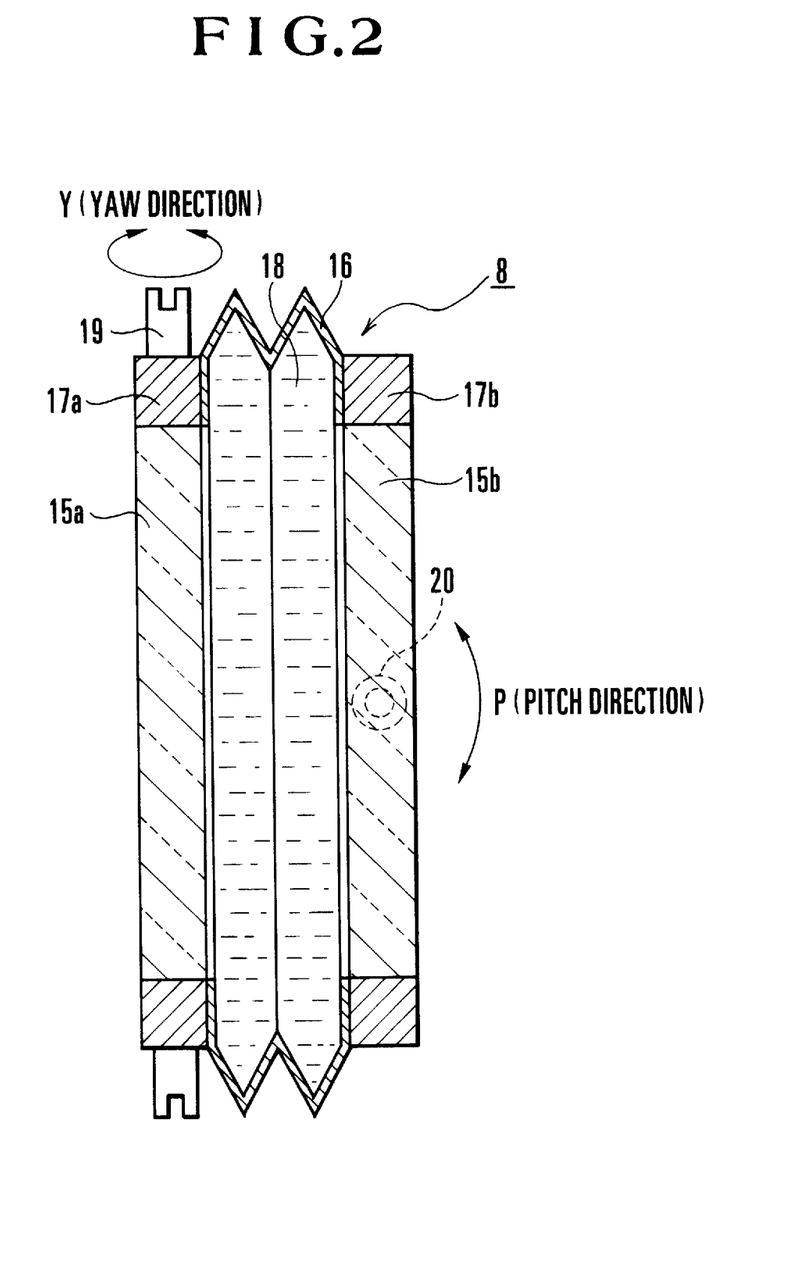
FIG. 2 is a vertical sectional view showing a variable angle prism included in the image pickup apparatus having the image stabilizing function arranged as shown in FIG. 1.

The variable angle prism 8 is configured as shown in FIG. 2. Referring to FIG. 2, the variable angle prism 8 consists of transparent flat glass parts 15a and 15b, a bellows part 16 which is made of an elastic material and inserted in between the flat glass parts 15a and 15b, holding members 17a and 17b which are arranged to hold the flat glass parts 15a and 15b, a liquid 18 which is sealed in a tightly closed space formed jointly by the holding members 17a and 17b and the bellows part 16, a rotation shaft 19 which is provided on the holding member 17a for rotation in the direction of yaw (in the direction of arrow Y as shown in FIG. 2) and a rotation shaft 20 which is provided on the other holding member 17b for rotation in the direction of pitch (in the direction of arrow P). An image shake in the horizontal direction of the image plane is corrected by causing the flat glass part 15a to swing on the rotation shaft 19 in the yaw direction (in the direction of arrow Y). An image shake in the vertical direction of the image plane is corrected by causing the other flat glass part 15b to swing on the rotation shaft 20 in the pitch direction (in the direction of arrow P).

The actuator 9a is arranged to tilt the flat glass part 15a of the variable angle prism 8 in the yaw direction and to tilt the other flat glass part 15b of the variable angle prism 8 in the pitch direction. The driving circuit 10a is arranged to drive the actuator 9a. The other driving circuit 10b is arranged to drive the other actuator 9b. The angular velocity sensor 11a is arranged to detect vibrations imparted to the image pickup apparatus in the pitch direction (vertical direction). The other angular velocity sensor 11b is arranged to detect vibrations imparted to the image pickup apparatus in the yaw direction (horizontal direction).

The integrating circuit 12a is arranged to integrate a signal outputted from the angular velocity sensor 11a and to output an angular-displacement-amount signal indicative of the amount of angular displacement caused in the direction of pitch by the vibrations imparted to the image pickup apparatus. The other integrating circuit 12b is arranged to integrate a signal outputted from the other angular velocity sensor 11b and to output an angular-displacement-amount signal indicative of the amount of angular displacement in the direction of yaw caused by the vibrations imparted to the image pickup apparatus.

The A/D converter 13a is arranged to convert the angular-displacement-amount signal outputted from the integrating circuit 12a in the form of an analog signal into a digital signal. The other A/D converter 13a is arranged to convert the angular-displacement-amount signal outputted from the other integrating circuit 12b in the form of an analog signal also into a digital signal.

The optical image-shake correcting microcomputer 14 is arranged to obtain the amounts of driving by which the flat glass parts 15a and 15b of the image-shake correcting variable angle prism 8 are to be driven, on the basis of the angular-displacement-amount signal which relates to the vibrations in the pitch direction and comes from the A/D converter 13a and the angular-displacement-amount signal which relates to the vibrations in the yaw direction and comes from the other A/D converter 13b. The optical image-shake correcting microcomputer 14 then controls the actuators 9a and 9b on the basis of the amounts of driving thus obtained. The optical image-shake correcting microcomputer 14 is connected to the image-stabilizing-means selecting microcomputer 7.

The electronic image-shake correcting means B consists of an A/D converter 21, an electronic image-shake correcting control circuit 22, an interpolation process circuit 23, a D/A converter 24 and a field memory 25. The A/D converter 21 is arranged to convert an analog video signal outputted from the image sensor 2 into a digital video signal.

The electronic image-shake correcting control circuit 22 includes a memory control circuit 22a, a motion detecting circuit 22b and an electronic zoom control circuit 22c. The electronic image-shake correcting control circuit 22 is arranged to detect, by means of the motion detecting circuit 22b, a shake of the video signal outputted from the image sensor 2 through the A/D converter 21. The amount of motion of the video signal is thus obtained. A predetermined image information is read out from the field memory 25 by controlling the field memory 25 by means of the memory control circuit 22a, in such a way as to lower a component of the video signal representing the shake. Then, the electronic image-shake correcting control circuit 22 performs a process of enlarging the whole image plane (electronic zooming) by means of the electronic zoom control circuit 22c. The interpolation process circuit 23 is arranged to perform an interpolation process to obtain one picture-element signal from information related to at least two adjoining picture elements.

The details of this electronic zooming action are as follows: The memory control circuit 22a causes the picked-up image signal outputted from the A/D converter 21 to be stored in the field memory 25 at a predetermined rate. The motion detecting circuit 22b compares the image information of a current field with the image information of a preceding field to detect any motion taking place between the image planes of these two fields. A motion vector is thus detected. The memory control circuit 22a then acts to shift the image in such a way as to cancel the motion of the image represented by the motion vector. More specifically, the image is shifted by controlling the image-reading position of the field memory 25 from which the image is read out, i.e., the image reading address. Compensation for the motion of the image thus can be adequately accomplished by this action.

Meanwhile, the size of an image plane to be actually read out is arranged to be smaller than the image plane size of the field memory 25 for the purpose of having a range of reading shiftable within the storage space of the field memory 25. Therefore, the electronic zoom control circuit 22c performs a process of enlarging the read-out image to a normal image plane size by controlling a rate at which the image is read out from the field memory 25.

Any information drop-out between picture elements and between scanning lines resulting from the enlarging process is compensated for by the interpolation process circuit 23 which performs interpolation with information obtained between adjacent picture elements or between adjacent scanning lines. Any image shake thus can be electronically corrected through these processes.

The D/A converter 24 is arranged to convert the digital image signal outputted from the interpolation process circuit 23 into an analog image signal. The analog image signal is outputted and supplied to a predetermined part such as a VTR or a monitor.

The image pickup apparatus having the image stabilizing function arranged in the manner as described above performs its basic operation as described below:

A picked-up image formed on the image sensor 2 through the image pickup optical system 1 is sampled at a predetermined sampling frequency. An image signal thus sampled is converted into a digital image signal by the A/D converter 21 of the electronic image-shake correcting means B. The digital image signal is supplied through the memory control circuit 22a of the electronic image-shake correcting circuit 22 to the field memory 25 to be stored therein. The amounts of motion x and y in the horizontal and vertical directions of the picked-up image are obtained from a correlation between the image information stored in the field memory 25 and the image information stored for a next field or a next frame. Any image-shake is mitigated by reading out a part of the image information from the field memory 25 by shifting datum points according to the amounts of motion x and y.

Figure 4:
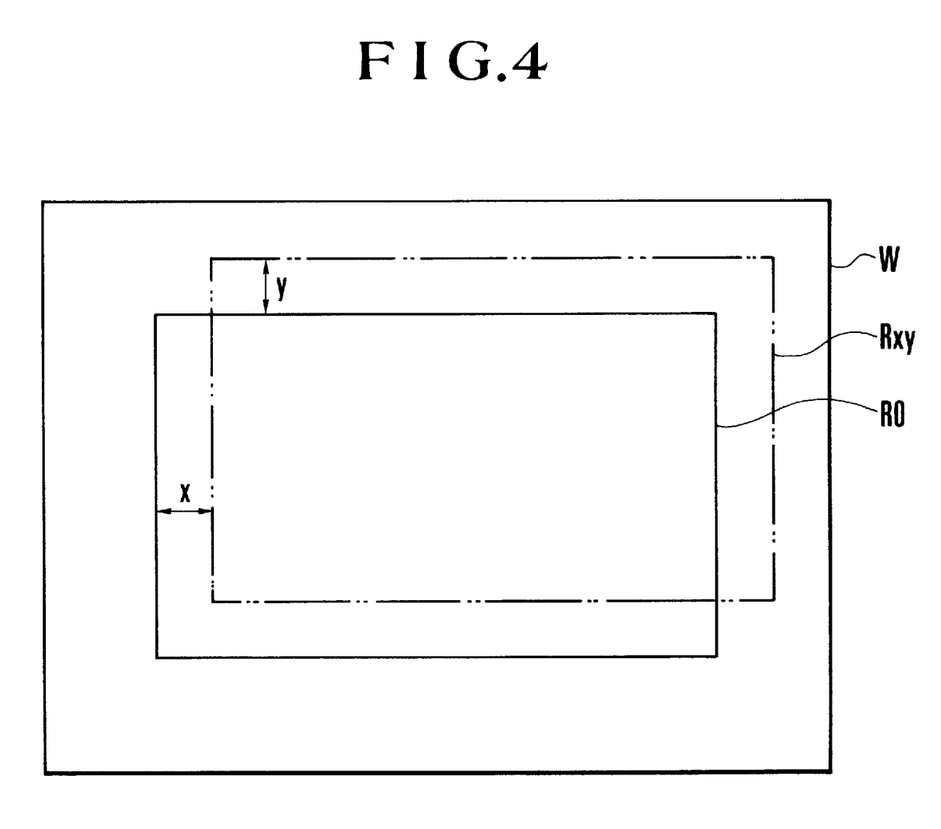
FIG. 4 shows a shifting state of datum points obtained when image information is read out from a field memory arranged in the image pickup apparatus having the image stabilizing function shown in FIG. 1.

The shifting state of the datum points is shown in FIG. 4. In FIG. 4, reference symbol W denotes an area which is written into the field memory 25 as video image information. The area W is made always constant. Reference symbol R0 denotes an area to be read out from the field memory 25 when the above-stated amounts of motion are zero. Reference symbol Rxy denotes an area to be read out from the field memory 25 when the amount of motion in the horizontal direction is x and the amount of motion in the vertical direction is y.

The area Rxy read out is enlarged to the image plane size of the area W by the electronic zoom control circuit 22c and the interpolation process circuit 23. The video image information enlarged is outputted and supplied to a video tape recorder (VTR) or a monitor.

Figure 3:
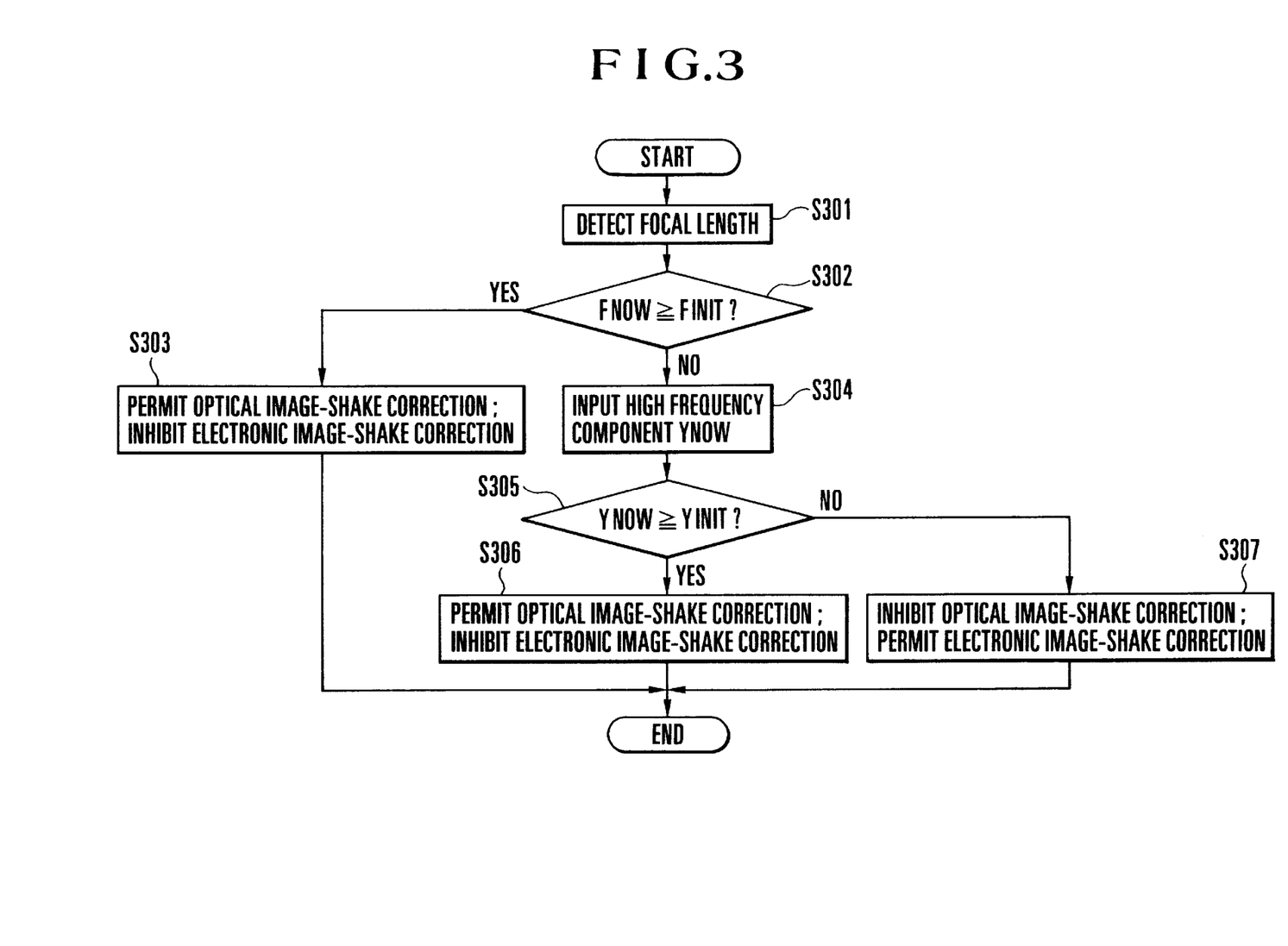
FIG. 3 is a flow chart showing the control procedures of the image pickup apparatus having the image stabilizing function shown in FIG. 1.

The actions of the features of the image pickup apparatus arranged according to this invention are described with reference to FIG. 3 as follows: FIG. 3 is a flow chart showing a control program stored in the image-stabilizing-means selecting microcomputer 7. At a step S301, the current focal length F NOW of the image pickup optical system 1 is detected by reading the digital value of the output of the encoder 3 through the first A/D converter 5. At a step S302, the current focal length F NOW is compared with a predetermined focal length F INIT. A check is made to find if the current focal length F NOW is closer to a telephoto end value or to a wide-angle end value than the predetermined focal length F INIT. If the current focal length F NOW is found to be equal to or larger than the predetermined focal length F INIT, thus indicating that the current focal length F NOW is closer to the telephoto end value than the predetermined focal length F INIT, the flow of operation comes to a step S303. At the step S303, an optical image-shake correction by the optical image-shake correcting means A is permitted and an electronic image-shake correction by the electronic image-shake correcting means B is inhibited, by setting an output port connected to the optical image-shake correcting microcomputer 14 and by clearing an output port connected to the electronic image-shake correcting control circuit 22. The flow of this processing action then comes to an end. In other words, in a case where the focal length is at a telephoto side value above a predetermined value, the optical image-shake correcting means A is operated.

Each of the optical image-shake correcting microcomputer 14 and the electronic image-shake correcting control circuit 22 is arranged to carry out an image-shake correcting action if its input port which is connected to the image-stabilizing-means selecting microcomputer 7 is set and not to carry out the image-shake correcting action if the same input port is cleared. The optical image-shake correcting means A is thus selected in cases where the focal length belongs to the telephoto side at which the adverse effect of an image-shake is great.

If the current focal length F NOW is found to be at a value smaller than that of the predetermined focal length F INIT at the step S302, i.e., if the current focal length F NOW is found to be closer to a wide-angle end value than the predetermined focal length F INIT, the flow of operation comes to a step S304. At the step S304, a high frequency component Y NOW of the current video signal is obtained through the second A/D converter 6 from the high-pass filter (HPF) 4 as a digital signal.

The flow of operation then comes to a step S305. At the step S305, the current high frequency component Y NOW of the video signal is compared with a threshold value Y INIT which has been set beforehand. If the current high frequency component Y NOW is found to be equal or larger than the threshold value Y INIT, the flow comes to a step S306. At the step S306, the optical image-shake correction by the optical image-shake correcting means A is permitted and the electronic image-shake correction by the electronic image-shake correcting means B is inhibited, by setting the output port connected to the optical image-shake correcting means B and by clearing the output port connected to the electronic image-shake correcting control circuit 22. The process then comes to an end. Even in a case where the focal length belongs to the wide-angle side, if the high frequency component of the video signal is found to be larger than a predetermined value, i.e., in the event of a fine and elaborate picture, such as shooting a distant landscape, etc., the optical image-shake correcting means A is selected to prevent the quality of the image from deteriorating.

Further, if the current high frequency component Y NOW is found at the step S305 to be smaller than the predetermined threshold value Y INIT, the flow of operation comes to a step S307. At the step S307, the optical image-shake correction by the optical image-shake correcting means A is inhibited and the electronic image-shake correction by the electronic image-shake correcting means B is permitted, by clearing the output port connected to the optical image-shake correcting microcomputer 14 and by setting the output port connected to the electronic image-shake correcting control circuit 22. The process then comes to an end. By this process, in a case where the current focal length belongs to the wide-angle side and the high frequency component of the current video signal is smaller than the predetermined value, a certain amount of deterioration of the image quality is judged to be permissible. In that case, the electronic image-shake correcting means B is selected to save electrical energy. This process is provided, because the optical image-shake correcting means A necessitates use of a relatively large amount of power for driving the variable angle prism, etc. Therefore, the consumption of electrical energy can be lowered by avoiding the use of the optical image-shake correcting means A.

The processes described above are repeat. The optical image-shake correcting means A or the electronic image-shake correcting means B is selected, whichever is better suited according to the current focal length of the image pickup optical system and the value of the high frequency component of the video signal. The electric energy thus can be saved while effectively preventing the image quality from deteriorating.

To recapitulate what is described in detail above, the image pickup apparatus having the image stabilizing function according to the embodiment of this invention is arranged as follows: The optical image-shake correcting means A is selected when the (focal length) position of the image pickup optical system is on the telephoto side. The electronic image-shake correcting means B is selected when the (focal length) position of the image pickup optical system is on the wide-angle side. Therefore, in a case where the position of the image pickup optical system is on the wide-angle side, it is not necessary to drive the actuator for tilting the variable angle prism of the optical image-shake correcting means, so that electrical energy can be saved according to the invented arrangement.

Further, the optical image-shake correcting means A is selected when the value of the high frequency component of the video signal is equal to or larger than a predetermined value. The electronic image-shake correcting means B is selected when the value of the high frequency component is less than the predetermined value. Therefore, the image of an object of shooting such as a distant landscape or the like can be taken without lowing the quality of the image.

In the embodiment described above, the threshold value of the focal length and the threshold value of the high frequency component which are to be used for selection between the optical and electronic image-shake correcting means A and B can be varied as desired according to the characteristic of the optical system or that of the signal processing system used for the apparatus.

What is claimed is:

1. An image pickup apparatus having an image stabilizing function, comprising:

vibration detecting means for detecting vibrations imparted to said image pickup apparatus;

first image-shake correcting means for correcting a shake of a picked-up image;

second image-shake correcting means for correcting the shake of a picked-up image, said second image-shake correcting means being different from said first image-shake correcting means;

image magnifying power detecting means for detecting the image magnifying power of an image-pickup optical system of said image pickup apparatus; and control means for controlling said first image-shake correcting means and said second image-shake correcting means according to the image magnifying power detected by said image magnifying power detecting means.

2. An apparatus according to claim 1, wherein said first image-shake correcting means comprises an optical image-shake correcting means arranged to correct the shake of the picked-up image by tilting at least one of a plurality of optical members, wherein said second image-shake correcting means comprises an electronic image-shake correcting means including storage means for storing image information and arranged to correct the shake of the picked-up image by reading out predetermined image information from said storage means, and wherein said control means is arranged to select said optical image-shake correcting means when the image magnifying power of said image-pickup optical system belongs to a high power side, and to select said electronic image-shake correcting means when the image magnifying power of said image-pickup optical system belongs to a low power side.

3. An apparatus according to claim 2, wherein said optical image-shake correcting means includes a variable angle prism.

4. An apparatus according to claim 1, wherein said vibration detecting means includes angular velocity sensors arranged to detect vibrations taking place in horizontal and vertical directions.

5. An apparatus according to claim 2, wherein said control means is arranged to inhibit said electronic image-shake correcting means from acting, when said optical image-shake correcting means is selected.

6. An apparatus according to claim 2, wherein said electronic image-shake correcting means includes an image memory arranged to store an image for one picture, motion-vector detecting means for detecting a motion vector on the basis of an output of said vibration detecting means, and memory control means for varying, on the basis of the motion vector, a position at which the image is read out from said image memory.

7. An apparatus according to claim 6, further comprising image enlarging means for enlarging the image read out from said image memory.

8. An image pickup apparatus comprising:

detecting means for detecting image shake vibrations imparted to said image pickup apparatus;

optical image-shake correcting means for correcting a movement of a picked-up image;

electronic image-shake correcting means for correcting the movement of the picked-up image independently of said optical image-shake correcting means;

extracting means for extracting a high frequency component included in a video signal; and control means for controlling said optical image-shake correcting means and said electronic image-shake correcting means according to the high frequency component extracted by said extracting means.

9. An apparatus according to claim 8, wherein said optical image-shake correcting means is arranged to correct the shake of the picked-up image by tilting at least one of a plurality of optical members, wherein said comprises electronic image-shake correcting means includes storage means for storing image information and is arranged to correct the shake of the picked-up image by reading out predetermined image information from said storage means, and wherein said control means is arranged to select said optical image-shake correcting means when the value of the high frequency component of the video signal is equal to or larger than a predetermined value and to select said electronic image-shake correcting means when the value of the high frequency component of the video signal is less than the predetermined value.

10. An apparatus according to claim 9, further comprising magnifying-power detecting means for detecting a magnifying power of an image-pickup optical system.

11. An apparatus according to claim 10, wherein, if the magnifying power detected by said magnifying-power detecting means is equal to or larger than a predetermined value, said optical image-shake correcting means is caused to act irrespective of the value of the high frequency component extracted by said extracting means.

12. An apparatus according to claim 10, which said control means is arranged to make a selection between said optical image-shake correcting means and said electronic image-shake correcting means on the basis of the value of the high frequency component only when the magnifying power detected by said magnifying-power detecting means is less than the predetermined value.

13. An apparatus according to claim 9, wherein said electronic image-shake correcting means includes an image memory arranged to store an image for one picture, motion-vector detecting means for detecting a motion vector on the basis of an output of said vibration detecting means, and memory control means for varying, on the basis of the motion vector, a position at which the image is read out from said image memory.

14. An apparatus according to claim 13, further comprising image enlarging means for enlarging the image read out from said image memory.

15. A video camera comprising:

a) optical image-shake correcting means;

b) electronic image-shake correcting means;

c) motion detecting means for detecting a relative movement taking place between said video camera and an object of shooting;

d) zoom means for varying an angle of view; and e) control means for controlling one of said optical image-shake correcting means and said electronic image-shake correcting means on the basis of a zoom magnifying power of said zoom means.

16. A video camera according to claim 15, wherein said control means is arranged to cause said optical image-shake correcting means to act when the zoom magnifying power is equal to or larger than a predetermined value and to cause said electronic image-shake correcting means to act when the zoom magnifying power is less than the predetermined value.

17. A video camera according to claim 15, wherein said optical image-shake detecting means includes a variable angle prism.

18. A video camera according to claim 15, wherein said electronic image-shake correcting means includes an image memory arranged to store an image for one picture, motion-vector detecting means for detecting a motion vector on the basis of an output of vibration detecting means, and memory control means for varying, on the basis of the motion vector, a position at which the image is read out from said image memory.

19. A video camera according to claim 18, further comprising image enlarging means for enlarging the image read out from said image memory.

20. An image pickup apparatus comprising:

detecting means for detecting image shake vibration imparted to said image pickup apparatus;

optical image-shake correcting means for correcting a movement of a picked-up image;

electronic image-shake correcting means for correcting the movement of the picked-up image independently of said optical image-shake correcting means; and control means for controlling said optical image-shake correcting means and said electronic image-shake correcting means according to a predetermined component of an image signal which is different from an output of said detecting means.

21. Apparatus according to claim 20, wherein said optical image-shake correcting means is arranged to correct the shake of a picked-up image by tilting at least one of a plurality of optical members, wherein said electronic image-shake correcting means includes storage means for storing image information and is arranged to correct the picked-up image by reading out predetermined image information from said storage means, and wherein said control means is arranged to select said optical image-shake correcting means when the value of the predetermined component of a received video signal is equal to or larger than a predetermined value and to select said electronic image-shake correcting means when the value of the predetermined component of the video signal is less than the predetermined value.

22. Apparatus according to claim 21, further comprising magnifying power detecting means for detecting a magnifying power of an image-pickup optical system.

23. Apparatus according to claim 22, wherein, if the magnifying power detected by said magnifying power detecting means is equal to or larger than a predetermined value, said optical image-shake correcting means is caused to act irrespective of the value of the predetermined component.

24. Apparatus according to claim 22, in which said control means is arranged to make a selection between said optical image-shake correcting means and said electronic image-shake correcting means on the basis of the value of the predetermined component only when the magnifying power detected by said magnifying power detecting means is less than the predetermined value.

25. Apparatus according to claim 21, wherein said electronic image-shake correcting means includes an image memory arranged to store an image for one picture, motion vector detecting means for detecting a motion vector on the basis of an output of said vibration detecting means, and memory control means for varying, on the basis of the motion vector, a position at which the image is read out from said image memory.

26. Apparatus according to claim 25, further comprising image enlarging means for enlarging the image read out from said image memory.

27. An image processing apparatus for use with a zoom device, said apparatus comprising:
   detecting means for detecting a relative movement between said apparatus and an object;
   optical image-shake correcting means for correcting the movement;
   electrical image-shake correcting means for correcting the movement; and
   control means for controlling said optical image-shake correcting means and said electrical image-shake correcting means according to a zoom magnifying power of the zoom device.

28. Apparatus according to claim 27, wherein said control means is arranged to cause said optical image-shake correcting means to act when the zoom magnifying power is equal to or larger than a predetermined value, and to cause said electrical image-shake correcting means to act when the zoom magnifying power is less than the predetermined value.

29. Apparatus according to claim 27, wherein said optical image-shake correcting means includes a variable angle prism.

30. Apparatus according to claim 27, wherein said electronic image-shake correcting means includes an image memory arranged to store an image for one picture, motion-vector detecting means for detecting a motion vector on the basis of an output of vibration detecting means, and memory control means for varying, on the basis of the motion vector, a position at which the image is read out from said image memory.

31. Apparatus according to claim 30, further comprising image-enlarging means for enlarging the image read out from said image memory.

32. A storage medium for storing a computer-readable program for causing a processing apparatus to process an image received through a zoom device, the stored program comprising:
   detecting step for causing a detecting means to detect a relative movement between an apparatus and an object;
   an optical correcting step for correcting the movement using optical image-shake correcting means;
   an electrical correcting step for correcting the movement using electrical image-shake correcting means; and
   a control step for controlling said optical image-shake correcting step and said electrical image-shake correcting step according to a zoom magnifying power of the zoom device.

33. A medium according to claim 32, wherein said control step causes said optical image-shake correcting means to act when the zoom magnifying power is equal to or larger than a predetermined value, and causes said electronic image-shake correcting means to act when the zoom magnifying power is less than the predetermined value.

34. A medium according to claim 32, wherein said optical correcting step includes the step of correcting the movement with a variable angle prism.

35. A medium according to claim 32, wherein said electrical correcting step includes the steps of using an image memory to store an image for one picture, detecting a motion vector on the basis of an output of said detecting step, and varying, on the basis of the motion vector, a position at which the image is read out from said image memory.

36. A medium according to claim 35, further comprising the step of causing image-enlarging means to enlarge the image read out from said memory.

37. An image processing apparatus for processing a received image signal, said apparatus comprising:
   detecting means for detecting a relative movement between said apparatus and an object;
   optical image-shake correcting means for correcting the movement;
   electrical image-shake correcting means for correcting the movement; and
   control means for controlling said optical image-shake correcting means and said electrical image-shake correcting means according to a predetermined component of the received image signal which is different from an output of said detecting means.

38. Apparatus according to claim 37, wherein said optical image-shake correcting means is arranged to correct the shake of a picked-up image by tilting at least one of a plurality of optical members, wherein said electrical image-shake correcting means includes storage means for storing image information and is arranged to correct the picked-up image by reading out predetermined image information from said storage means, and wherein said control means is arranged to select said optical image-shake correcting means when the value of the predetermined component of a received video signal is equal to or larger than a predetermined value and to select electrical image-shake correcting means when the value of the predetermined component of the video signal is less than the predetermined value.

39. Apparatus according to claim 38, further comprising magnifying power detecting means for detecting a magnifying power of an image-pickup optical system.

40. Apparatus according to claim 39, wherein, if the magnifying power detected by said magnifying power detecting means is equal to or larger than a predetermined value, said optical image shake correcting means is caused to act irrespective of the value of the predetermined component.

41. Apparatus according to claim 39, wherein said control means is arranged to make a selection between said optical image-shake correcting means and said electrical image-shake correcting means on the basis of a value of the predetermined component only when the magnifying power detected by said magnifying power detecting means is less than the predetermined value.

42. Apparatus according to claim 38, wherein said electrical image-shake correcting means includes an image memory arranged to store an image for one picture, motion vector detecting means for detecting a motion vector on the basis of an output of said vibration detecting means, and memory control means for varying, on the basis of the motion vector, a position at which the image is read out from said image memory.

43. A storage medium for storing a computer-readable program for causing a processing apparatus to process a received image signal, the stored program comprising:
   a detecting step for causing a detecting means to detect a relative movement between said apparatus and an object; and
   an optical image-shake correcting step for optically-correcting the movement;
   an electrical image-shake correcting step for electrically correcting the movement; and
   a control step for controlling said optical image-shake correcting step and said electrical image-shake correcting step according to a predetermined component of the received image signal which is different from an output of said detecting step.

44. A medium according to claim 43, wherein said optical image-shake correcting step corrects the shake of a picked-up image by tilting at least one of a plurality of optical members, wherein said electrical image-shake correcting step includes the steps of storing image information and correcting the picked-up image by reading out predetermined stored image information, and wherein said control step selects the optical image-shake correcting step when the value of the predetermined component of a received video signal is equal to or larger than a predetermined value, and selects the electrical image-shake correcting step when the value of the predetermined component of the video signal is less than the predetermined value.

45. A medium according to claim 44, further comprising the step of detecting a magnifying power of an image-pickup optical system.

46. A medium according to claim 45, wherein, if the magnifying power detected by said magnifying power detecting step is equal to or larger than a predetermined value, said optical image-shake correcting step is activated irrespective of the value of the predetermined component.

47. A medium according to claim 45, wherein said control step is arranged to make a selection between said optical image-shake correcting step and said electrical image-shake correcting step on the basis of a value of the predetermined component only when the magnifying detecting step detects a magnifying power which is less than a predetermined value.

48. A medium according to claim 44, wherein said electrical image-shake correcting step includes the step of using an image memory to store an image for one picture, detecting a motion vector on the basis of an output of said detecting step, and varying, on the basis of the motion vector, a position at which the image is read out from said image memory.

49. An image processing apparatus for processing a received image signal, said apparatus comprising:

optical correction means for correcting a relative movement between the apparatus and an object;

electronic correction means for correcting said relative movement; and control means for controlling the optical correction means and the electronic correction means according to a predetermined component contained in the received image signal.

50. Apparatus according to claim 49, wherein said optical correction means is arranged to correct a shake of a picked-up image by tilting at least one of a plurality of optical members, wherein said electronic correction means includes storage means for storing image information and is arranged to correct the picked-up image by reading out predetermined image information from said storage means, and wherein said control means is arranged to select said optical correction means when the value of the predetermined component of a received video signal is equal to or larger than a predetermined value and to select said electronic correction means when the value of the predetermined component of the video signal is less than the predetermined value.

51. Apparatus according to claim 50, further comprising magnifying power detecting means for detecting a magnifying power of an image pickup optical system.

52. Apparatus according to claim 51, wherein if the magnifying power detected by said magnifying power detecting means is equal to or larger than a predetermined value, said optical correction means is caused to act irrespective of the value of the predetermined component.

53. Apparatus according to claim 51, wherein said control means is arranged to make a selection between said optical correction means and said electric correction means on the basis of a value of the predetermined component only when the magnifying power detected by said magnifying power detecting means is less than the predetermined value.

54. Apparatus according to claim 50, wherein said electronic correction means includes an image memory arranged to store an image for one picture, motion vector detecting means for detecting a motion vector on the basis of an output of said vibration detecting means, and memory control means for varying, on the basis of the motion vector, a position at which the image is read out from said memory.

55. A storage medium for storing a computer-readable program for causing a processing apparatus to process a received image signal, said program including:

an optical image-shake correcting step for optically correcting a relative movement between the apparatus and the object;

an electronic image-shake correction step for electronically correcting said relative movement; and a control step for controlling the optical image-shake correction step and the electronic image-shake correction step according to a predetermined component in the received image signal.

56. A medium according to claim 43, wherein said optical image-shake correcting step corrects the shake of a picked-up image by tilting at least one of a plurality of optical members, wherein said electrical image-shake correcting step includes the step of storing image information and correcting the picked-up image by reading out predetermined stored image information, and wherein said control step selects the optical image-shake correcting step when the value of the predetermined component of a received video signal is equal to or larger than a predetermined value, and selects the electrical image-shake correcting step when the value of the predetermined component of the video signal is less than the predetermined value.

57. A medium according to claim 44, further comprising the step of detecting a magnifying power of an image-pickup optical system.

58. A medium according to claim 45, wherein, if the magnifying power detected by said magnifying power detecting step is equal to or larger than a predetermined value, said optical image-shake correcting step is activated irrespective of the value of the predetermined component.

59. A medium according to claim 45, wherein said control step is arranged to make a selection between said optical image-shake correcting step and said electrical image-shake correcting step on the basis of a value of the predetermined component only when the magnifying detecting step detects a magnifying power which is less than a predetermined value.

60. A medium according to claim 44, wherein said electrical image-shake correcting step includes the steps of using an image memory to store an image for one picture, detecting a motion vector on the basis of an output of said detecting step, and varying, on the basis of the motion vector, a position at which the image is read out from said image memory.

* * * * *